United States Patent
Meier et al.

(10) Patent No.: US 7,818,592 B2
(45) Date of Patent: Oct. 19, 2010

(54) TOKEN BASED POWER CONTROL MECHANISM

(75) Inventors: Stephan Meier, Sunnyvale, CA (US); Marius Evers, Sunnyvale, CA (US)

(73) Assignee: Globalfoundries Inc., Grand Cayman (KY)

( * ) Notice: Subject to any disclaimer, the term of this patent is extended or adjusted under 35 U.S.C. 154(b) by 794 days.

(21) Appl. No.: 11/788,215

(22) Filed: Apr. 18, 2007

(65) Prior Publication Data
US 2008/0263373 A1 Oct. 23, 2008

(51) Int. Cl.
*G06F 1/26* (2006.01)

(52) U.S. Cl. ............... 713/300; 713/310; 713/320; 713/321; 713/322; 713/323; 713/324; 713/330; 713/340

(58) Field of Classification Search ............. 713/300, 713/310, 320–324, 330, 340
See application file for complete search history.

(56) References Cited

U.S. PATENT DOCUMENTS

| 5,664,205 | A | 9/1997 | O'Brien et al. | |
|---|---|---|---|---|
| 5,996,083 | A | 11/1999 | Gupta et al. | |
| 6,826,704 | B1 | 11/2004 | Pickett | |
| 6,845,456 | B1 | 1/2005 | Menezes et al. | |
| 7,379,478 | B1 * | 5/2008 | Mantha | 370/493 |
| 7,444,526 | B2 * | 10/2008 | Felter et al. | 713/300 |
| 7,461,274 | B2 * | 12/2008 | Merkin | 713/300 |
| 2006/0005082 | A1 | 1/2006 | Fossum et al. | |
| 2006/0031836 | A1 | 2/2006 | Brown et al. | |
| 2007/0113105 | A1 | 5/2007 | Campbell et al. | |
| 2007/0116049 | A1 | 5/2007 | Johnson et al. | |
| 2007/0198867 | A1 | 8/2007 | Jorgenson et al. | |
| 2007/0220289 | A1 | 9/2007 | Holle et al. | |
| 2008/0077817 | A1 * | 3/2008 | Brundridge et al. | 713/340 |
| 2008/0133946 | A1 * | 6/2008 | Diab et al. | 713/310 |
| 2008/0301475 | A1 * | 12/2008 | Felter et al. | 713/300 |
| 2009/0044036 | A1 * | 2/2009 | Merkin | 713/340 |

FOREIGN PATENT DOCUMENTS

WO 94/16378 7/1994

OTHER PUBLICATIONS

International Search Report and Written Opinion for PCT Application No. PCT/US2008/004962 mailed Aug. 5, 2008.

* cited by examiner

*Primary Examiner*—Abdelmoniem Elamin
(74) *Attorney, Agent, or Firm*—Meyertons, Hood, Kivlin, Kowert & Goetzel, P.C.

(57) ABSTRACT

A token-based power control mechanism for an apparatus including a power controller and a plurality of processing devices. The power controller may detect a power budget allotted for the apparatus. The power controller may convert the allotted power budget into a plurality of power tokens, each power token being a portion of the allotted power budget. The power controller may then assign one or more of the plurality of power tokens to each of the processing devices. The assigned power tokens may determine the power allotted for each of the processing devices. The power controller may receive one or more requests from the plurality of processing devices for one or more additional power tokens. In response to receiving the requests, the power controller may determine whether to change the distribution of power tokens among the processing devices.

13 Claims, 5 Drawing Sheets

TOKEN BASED POWER CONTROL MECHANISM

BACKGROUND OF THE INVENTION

1. Field of the Invention

This invention relates to power management techniques and, more particularly, to a token-based power control mechanism.

2. Description of the Related Art

Power management techniques in electronic systems may not only reduce the power consumption of the system but may also improve the system performance. In various systems, a predetermined amount of power is provided to each of the different devices within the system. The system may include a power controller and a monitoring mechanism to monitor the power provided to each of the devices to prevent the power supply from providing too much power to any one device. For instance, the monitoring mechanism may detect when a power limit has been exceeded in one of the devices and may initiate, in conjunction with the power controller, corrective actions to decrease the power supplied to the device. Also, the monitoring mechanism may detect when a device is in a sleep mode and may adjust the power supplied accordingly. However, typical power management techniques do not effectively manage the power distribution in a system, and usually do not provide an adequate balance between system performance and power management.

SUMMARY

Various embodiments of a token-based power control mechanism are disclosed. According to one embodiment, an apparatus may include a plurality of processing devices and a power controller. The power controller may detect a power budget allotted for the apparatus. For instance, the power controller may detect a particular amount of power that is provided to the apparatus from a power supply during normal operations. The power controller may convert the allotted power budget into a plurality of power tokens, each power token being a portion of the allotted power budget. The power controller may then assign one or more of the plurality of power tokens to each of the processing devices. The assigned power tokens may determine the power allotted for each of the processing devices.

In one embodiment, the power controller may receive one or more requests from the plurality of processing devices for one or more additional power tokens. In response to receiving the requests, the power controller may determine whether to change the distribution of power tokens among the processing devices.

In one embodiment, each of the processing devices may detect its current power usage, and then compare its current power usage to the allotted power corresponding to the assigned power tokens for the processing device. If its current power usage is more than the allotted power, the processing device may request one or more additional power tokens from the power controller. If its current power usage is less than the allotted power for the processing unit by at least the power amount of a power token, the processing device may return one or more power tokens to the power controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
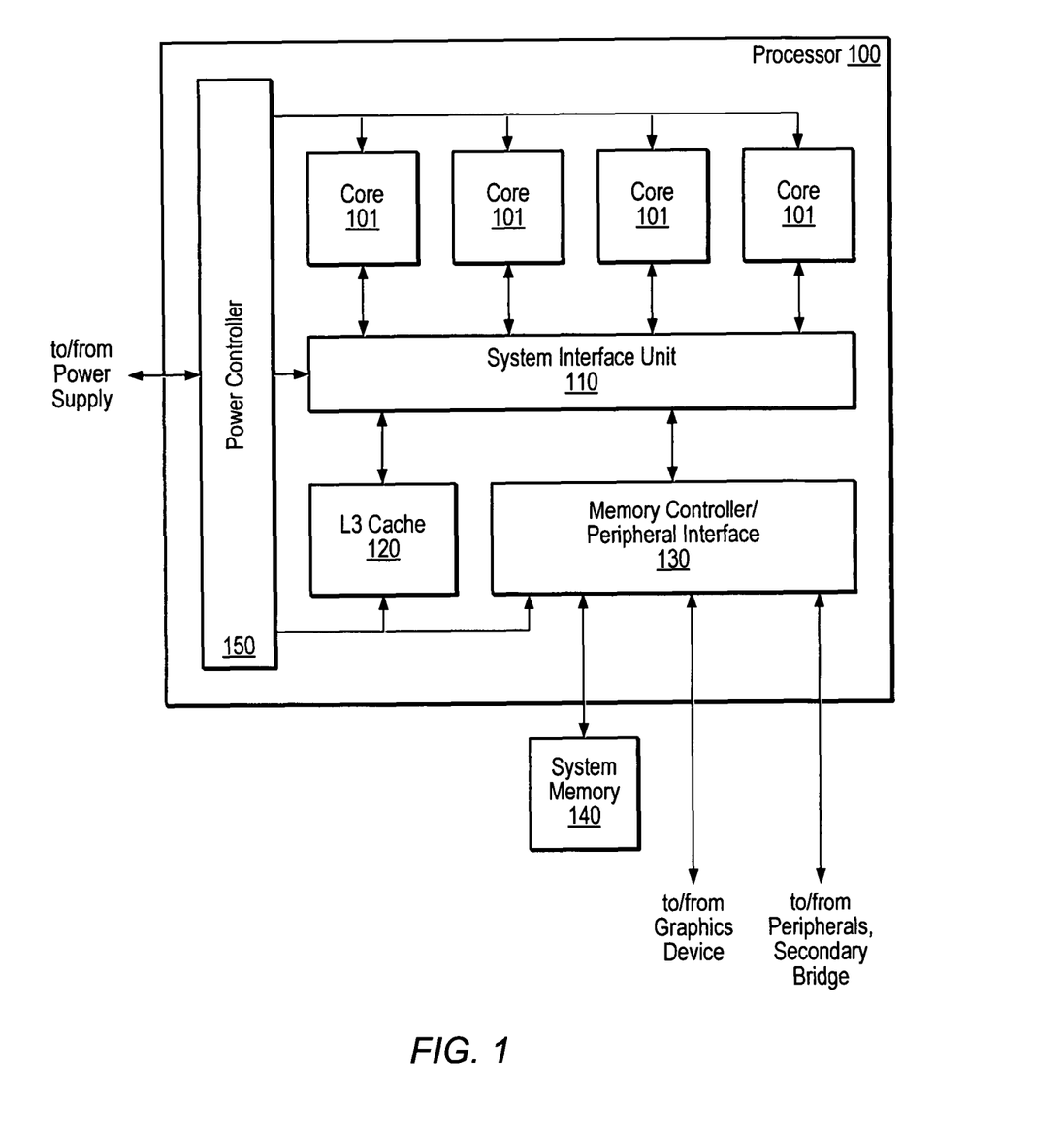
FIG. 1 is a block diagram of one embodiment of an exemplary processor including a plurality of processing devices.

Turning now to FIG. 1, a block diagram of one embodiment of an exemplary processor 100 is shown. A processor implementation may include multiple instances of a processing core fabricated as part of a single integrated circuit along with other structures. As shown, in one specific implementation, processor 100 may include four processing cores 101*a-d*, each of which may be configured as described below with reference to FIG. 5. In the illustrated embodiment, each of cores 101 may couple to an L3 cache 120 and a memory controller/peripheral interface unit (MCU) 130 via a system interface unit (SIU) 110. In one embodiment, L3 cache 120 may be configured as a unified cache, implemented using any suitable organization, that operates as an intermediate cache between L2 caches of cores 101 and relatively slow system memory 140.

MCU 130 may be configured to interface processor 100 directly with system memory 140. For example, MCU 130 may be configured to generate the signals necessary to support one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory that may be used to implement system memory 140. System memory 140 may be configured to store instructions and data that may be operated on by the various cores 101 of processor 100, and the contents of system memory 140 may be cached by various system caches.

Additionally, MCU 130 may support other types of interfaces to processor 100. For example, MCU 130 may implement a dedicated graphics processor interface such as a version of the Accelerated/Advanced Graphics Port (AGP) interface, which may be used to interface processor 100 to a graphics-processing subsystem, which may include a separate graphics processor, graphics memory and/or other components. MCU 130 may also be configured to implement one or more types of peripheral interfaces, e.g., a version of the PCI-Express bus standard, through which processor 100 may interface with peripherals such as storage devices, graphics devices, networking devices, etc. In some embodiments, a secondary bus bridge (e.g., a "south bridge") external to processor 100 may be used to couple processor 100 to other peripheral devices via other types of buses or interconnects. It is noted that while memory controller and peripheral interface functions are shown integrated within processor 100 via MCU 130, in other embodiments these functions may be implemented externally to processor 100 via a conventional "north bridge" arrangement. For example, various functions of MCU 130 may be implemented via a separate chipset rather than being integrated within processor 100.

Processor 100 may further include a power controller 150 connected to each of the processing devices, i.e., cores 101a-d, SIU 110, L3 cache 120, MCU 130, and to an external power supply. Power controller 150 may implement a token-based power control mechanism to manage the distribution of power from the power supply to the processing devices within processor 100, as will be described below with reference to FIG. 2 and FIG. 3.

In various embodiments, processor 100 may be included in any of various types of computing or processing systems, e.g., a workstation, a personal computer (PC), a server blade, a portable computing device, a game console, a system-on-a-chip (SoC), a television system, an audio system, among others. For instance, in one embodiment, processor 100 may be connected to a circuit board or motherboard of a computer system, which may also implement a token-based power control mechanism, e.g., as will be further described below with reference to FIG. 4.

Figure 2:
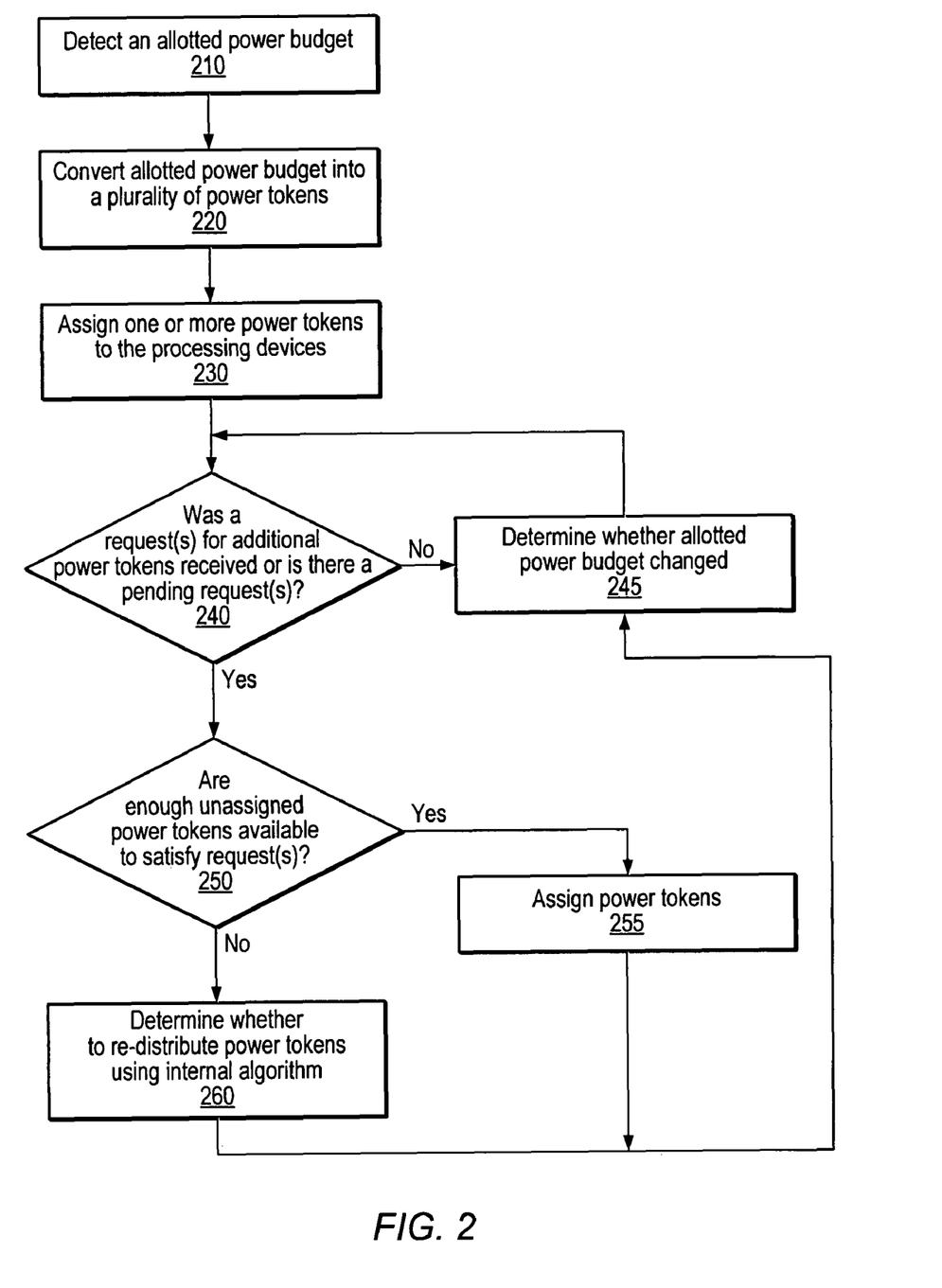
FIG. 2 is a flow diagram illustrating a method for implementing a token-based power control mechanism, according to one embodiment.

FIG. 2 is a flow diagram illustrating a method for implementing a token-based power control mechanism, according to one embodiment. It should be noted that in various embodiments, some of the steps shown may be performed concurrently, in a different order than shown, or omitted. Additional steps may also be performed as desired.

Referring collectively to FIG. 2 and FIG. 1, during operation, power controller 150 may detect a power budget allotted for processor 100 (block 210). For instance, processor 100 may be rated to receive a particular amount of power from a power supply during normal operations for optimal performance. In other cases, processor 100 may budgeted a certain amount of power depending on the power needs of the other devices in the system.

Power controller 150 may convert the allotted power budget into a plurality of power tokens (block 220). Each power token may be a portion of the allotted power budget. For instance, each power token may be a specific amount of power, e.g., 1 Watt, or may be a fraction of the allotted power budget, e.g., $\frac{1}{100}$ of the allotted power budget. Specifically, in the above example, if each token is $\frac{1}{100}$ of the allotted power budget, power controller 150 converts the allotted power budget into 100 tokens.

After converting the allotted power budget into power tokens, power controller 150 may assign power tokens to one or more of the processing devices of processor 100 (block 230). The assigned power tokens may determine the power allotted for each of the processing devices. In one embodiment, power controller 150 may assign power tokens to satisfy one or more requests that are received from the processing devices. In the illustrated embodiment of FIG. 1, the processing devices may include at least processing cores 101a-d, SIU 110, L3 cache 120, and MCU 130. It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, in various embodiments, processor 100 may include two processing cores or six processing cores.

During operation, power controller 150 may receive one or more requests for additional power tokens from one or more of the processing devices (block 240). For example, one of the processing devices may request extra power tokens, and/or a device that had not previously requested power tokens may send a request to power controller 150 for power tokens. If one or more requests are received or if there is at least one pending request that has not been satisfied (block 240), power controller 150 may determine whether it has enough unassigned power tokens available to satisfy the requests (block 250). If so, power controller 150 may assign the corresponding number of power tokens to the requesting processing devices (block 255).

If power controller 150 does not have enough unassigned power tokens, power controller 150 may determine whether to re-distribute the power tokens using an internal, programmable algorithm (block 260). It is noted, however, that in some embodiments power controller 150 may determine whether to re-distribute the power tokens using the algorithm whether or not power controller 150 has enough unassigned power tokens. In one embodiment, the algorithm may consider a variety of information to determine whether to re-distribute the power tokens and how to best re-distribute the power tokens. For instance, the algorithm may consider how many power tokens each processing device has, how many power tokens each processing devices wants, whether the set of processing devices is homogeneous or heterogeneous, and the relative priority of each processing device. It is noted, however, that the algorithm may consider other information.

In one embodiment, if power controller 150 determines that the power tokens need to be re-distributed, power controller 150 may request some of the processing devices to return one or more power tokens. In other embodiments, power controller 150 may implement a revocation scheme where it forcefully revokes power tokens from some of the processing devices to re-distribute the power tokens. This scheme may be useful in cases where a device is malfunctioning or otherwise fails to respond. It is noted, however, that in some embodiments other schemes may be implemented to re-distribute the power tokens.

In one specific implementation, if processor 100 has a homogeneous set of processing devices, the algorithm implemented in power controller 150 may determine the highest power consumer among the processing devices. Power controller 150 may assign some of the power tokens of the highest power consumer to the requesting device (e.g., the requesting devices with the highest priority) to re-distribute the power consumption. In another specific implementation, if processor 100 has a heterogeneous set of processing devices, the algorithm may analyze power consumption relative to a baseline. For example, if the processor 100 distributes power tokens between four processor cores and a cache, the baseline may be 23% for each processor core and 8% for the cache. During operation, if the cache is consuming 15% of the power, in this example the cache would be considered the highest power consumer among the processing devices relative to the baseline. Therefore, power controller 150 may re-distribute some of the power tokens to the requesting processing core with the highest priority. It is noted, however, that power controller 150 may include other types of algorithms to determine how to best re-distribute power tokens.

In some embodiments, the allotted power budget for processor 100 may be programmable or may vary during operation of the system. Therefore, at various points during operation, power controller 150 may determine whether the allotted power budget for processor 100 has changed (block 245). For instance, as illustrated in FIG. 2, this determination may be made after assigning power tokens (block 255), after determining whether to re-distribute power tokens (block 260), or if power controller 150 does not receive any requests for additional power tokens (block 240). It is noted that power controller 150 may also make this determination at other points in the process. If the allotted power budget for processor 100 has been increased, and there are pending requests for power tokens that have not been satisfied or if new requests are received (block 240), power controller 150 may satisfy these requests. However, if the allotted power budget for processor 100 has been decreased, power controller 150 may return some or all of the unassigned power tokens, or in some cases may revoke assigned power tokens, to reduce the power usage of processor 100 to match the new power budget. The process may repeat as shown in the embodiment of FIG. 2.

In various embodiments, besides assigning power tokens to the processing devices, power controller 150 may assign power tokens to individual sub-units within each processing device. For instance, power controller 150 may assign power tokens to sub-units of the processing cores 101, such as the instruction cache, instruction fetch unit, instruction decode unit, etc.

Figure 3:
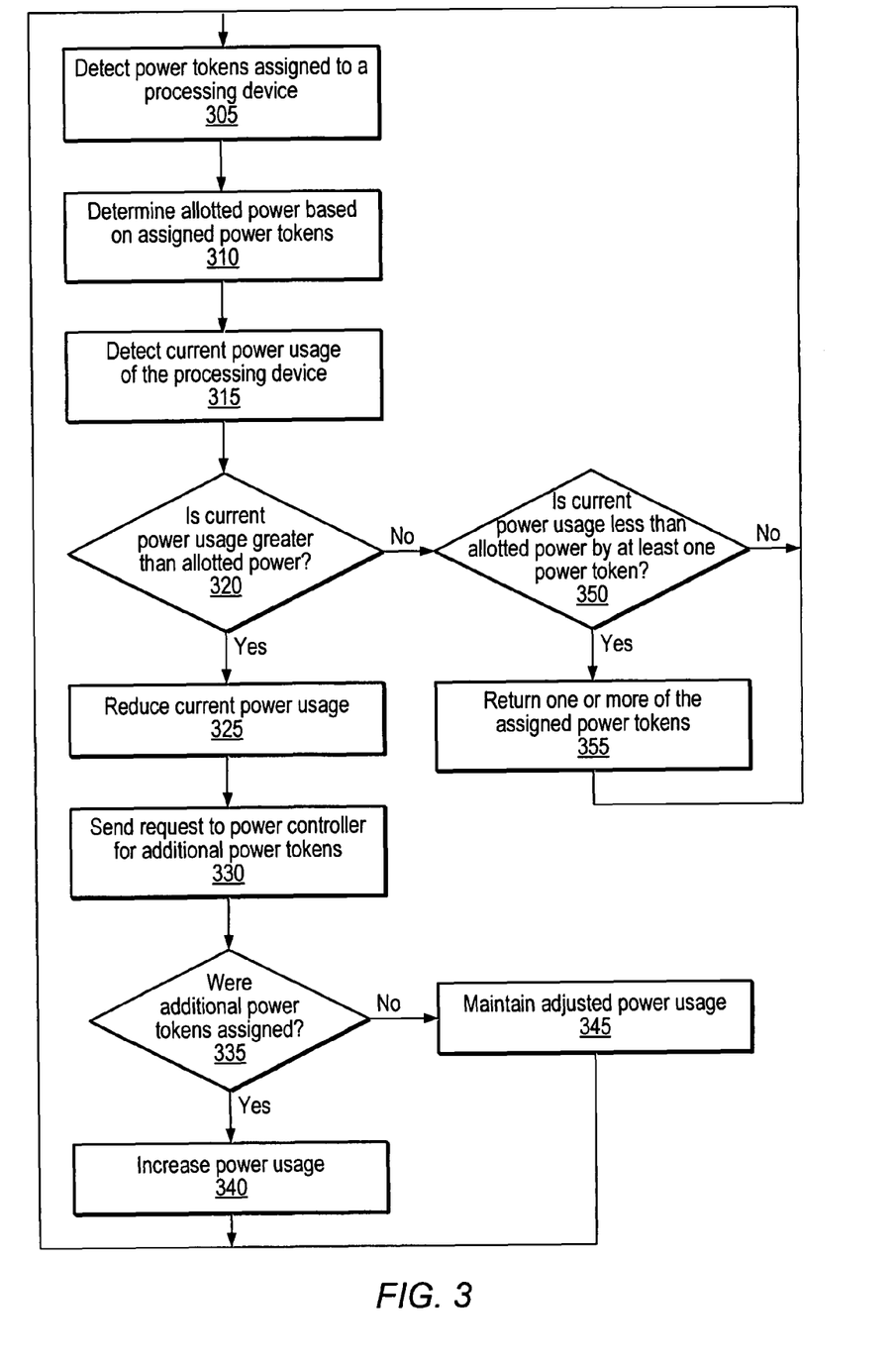
FIG. 3 is a flow diagram illustrating a method for determining whether to change the power budget allotted to one or more of the processing devices, according to one embodiment.

FIG. 3 is a flow diagram illustrating a method for determining whether to change the power budget allotted to one or more of the processing devices of processor 100, according to one embodiment. It should be noted that in various embodiments, some of the steps shown may be performed concurrently, in a different order than shown, or omitted. Additional steps may also be performed as desired.

Referring collectively to FIGS. 1-3, during operation, each of the processing devices may detect the power tokens assigned by power controller 150 (block 305). Each processing device may determine the allotted power based on the assigned power tokens (block 310). The processing devices may also determine their current power usage (block 315). For instance, each processing device may directly measure its current power usage. It is noted, however, that in other implementations each processing device may determine its current power usage by other methods, e.g., perform indirect measurements or infer its current power usage by analyzing its current operations.

Each processing device may then determine whether its current power usage is greater than the allotted power (block 320). If so, then each affected processing device may reduce its current power usage to a level at or below the allotted power (block 325). For instance, a processing device may reduce its current power usage by micro-architectural throttling, e.g., execute instructions every other cycle. It is noted, however, that a processing device may reduce its current power usage by other methods, for example, by frequency/voltage scaling.

Furthermore, the processing device may send a request to power controller 150 for additional power tokens (block 330). For instance, if the processing device needs an additional three tokens worth of power, the processing device may request that power controller 150 assign three or four additional power tokens. It is noted, however, that in some embodiments the processing device may send the request for additional power tokens first and only reduce the current power usage if additional power tokens are not received within a predetermined amount of time.

Each processing device may then determine whether additional power tokens were assigned to the device (block 340). If so, then the processing device may detect how many additional power tokens were assigned and increase its power usage accordingly (block 340). For example, the processing device may increase its power usage to the previous level if it is at or below the new power limit based on the newly assigned power tokens. If power controller 150 does not assign additional power tokens to the processing device, then the processing device may maintain its adjusted power usage, which is at or below the power allotted by power controller 150.

Returning to block 320, if the current power usage is less than the allotted power for a particular processing device, the processing device may determine whether the power usage is less than the allotted power by at least one power token worth of power (block 350). If so, then the processing device may return a corresponding number of the assigned power tokens to power controller 150 (block 355). For example, if the power usage is three and a half power tokens below the allotted power, the processing device may return three power tokens to power controller 150. In other implementations, if the power usage of the processing device is N power tokens below the allotted power, where N is an integer greater than or equal to 1, the processing unit may return N−1 power tokens to power controller 150. In this implementation, the one power token worth of power may provide the processing device some room in case the power usage varies from time to time. It is noted, however, that the criteria for returning power tokens may vary from one implementation to another, e.g., return N−2 power tokens, where N is greater than or equal to 2. It is further noted that in some implementations one or more of the processing devices may not return power tokens to power controller 150 regardless of their current power usage, for example, if the power usage of a device varies substantially from time to time. In some embodiments, after power controller 150 receives power tokens from one or more processing devices, power controller 150 may determine whether to re-distribute the power tokens or whether to provide the received power tokens to other processing devices.

This token-base power control mechanism that is implemented by power controller 150 can maintain fairness in a system where the allotted power budget is finite. At the same time, this mechanism allows efficient utilization of the allotted power budget. For example, it allows processing devices that need additional power to receive it when extra power tokens are available, or when the requesting device has a higher priority than other devices, etc. Besides achieving excellent power management, the efficient utilization of the allotted power budget results may also improve system performance.

In various embodiments, the token-based power control mechanism may be implemented in other types of integrated circuits (besides processors) that include a plurality of processing sub-units. For instance, in some embodiments, the token-based power control mechanism may be implemented in devices that do not have processing cores (e.g., cores 101), and instead have other types of electronic sub-units such as controllers or vector units, among others.

Figure 4:
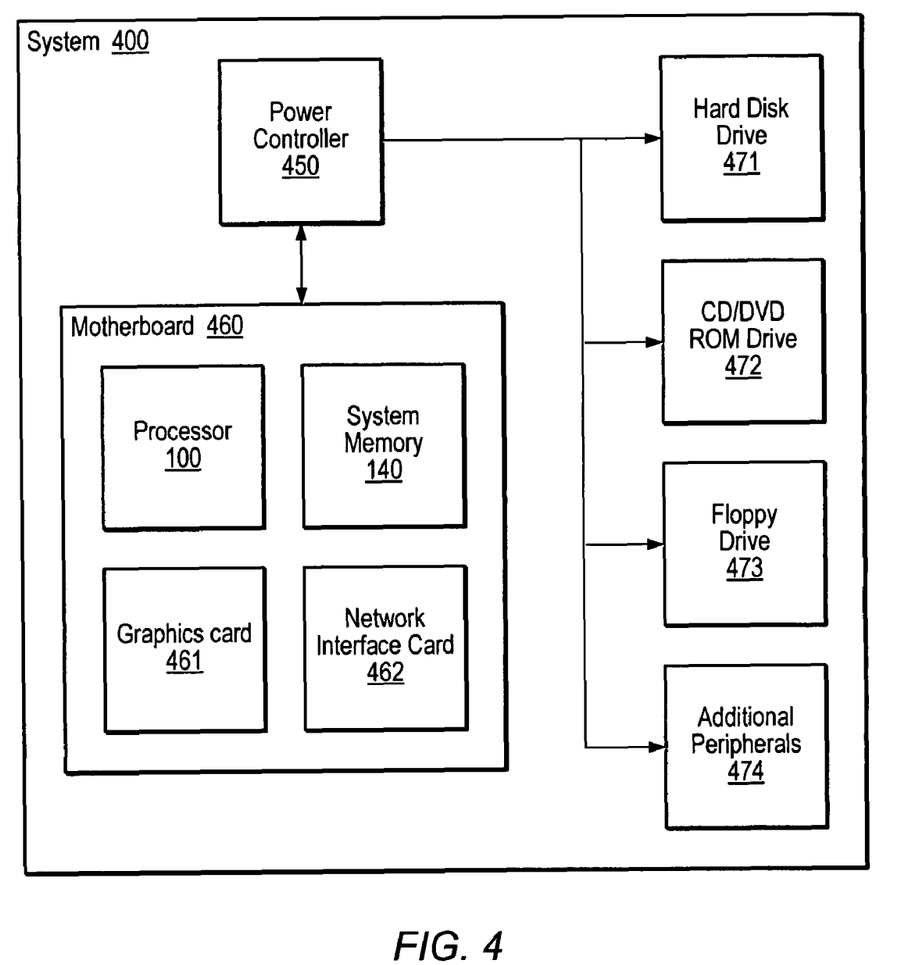
FIG. 4. is a block diagram of one embodiment of an exemplary computer system.

Furthermore, in other embodiments, may also be implemented at the system level in various types of electronic/computing systems. For instance, the token-based power control mechanism may be implemented in a computer system 400, as illustrated in the embodiment of FIG. 4. In one specific implementation, computer system 400 may include a power controller 450 and plurality of processing devices, such as a motherboard 460, processor 100, system memory 140, a graphics card 461, a network interface card 462, a hard disk drive 471, a CD/DVD ROM drive 472, a floppy drive 473, and additional peripherals 474. Power controller 450 may implement a token-based power control mechanism to manage the distribution of power from the power supply to the processing devices within computer system 400. The token-based power control mechanism may be implemented in a similar manner as described above with reference to FIGS. 1-3.

It should be noted that the components described with reference to FIG. 4 are meant to be exemplary only, and are not intended to limit the invention to any specific set of components or configurations. For example, in various embodiments, one or more of the components described may be omitted, combined, modified, or additional components included, as desired. For instance, the token-based power control mechanism may be implemented in other types of electronic/computing systems, such as a modular server system including a plurality of server units, e.g., server blades.

Figure 5:
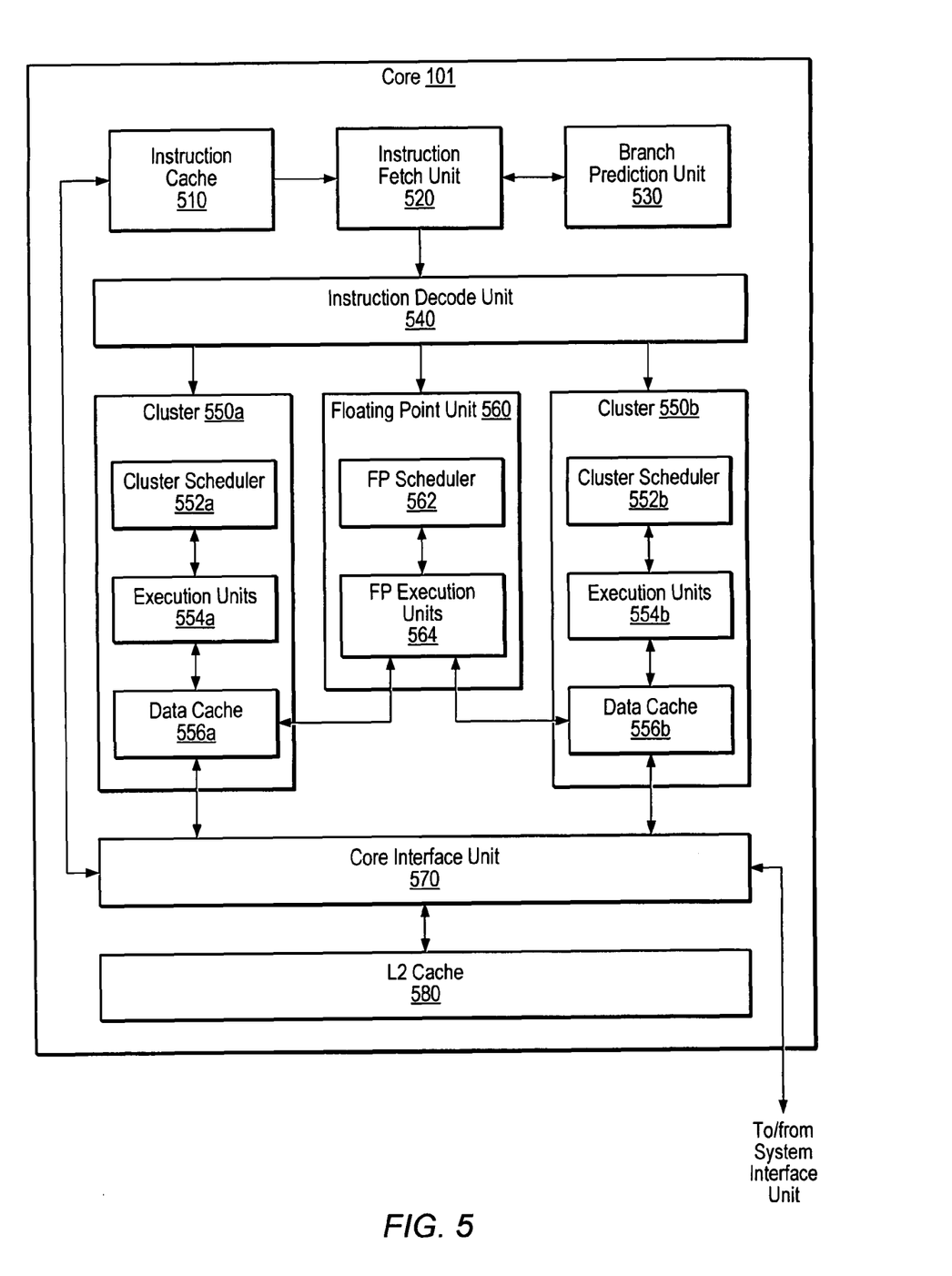
FIG. 5 is a block diagram of one embodiment of an exemplary processor core.

FIG. 5 is a block diagram of one embodiment of processor core 101. Generally speaking, core 101 may be configured to execute instructions that may be stored in a system memory that is directly or indirectly coupled to core 101. Such instructions may be defined according to a particular instruction set architecture (ISA). For example, core 101 may be configured to implement a version of the x86 ISA, although in other embodiments core 101 may implement a different ISA or a combination of ISAs.

In the illustrated embodiment, core 101 may include an instruction cache (IC) 510 coupled to provide instructions to an instruction fetch unit (IFU) 520. IFU 520 may be coupled to a branch prediction unit (BPU) 530 and to an instruction decode unit (DEC) 540. DEC 540 may be coupled to provide operations to a plurality of integer execution clusters 550a-b as well as to a floating point unit (FPU) 560. Each of clusters 550a-b may include a respective cluster scheduler 552a-b coupled to a respective plurality of integer execution units 554a-b. Clusters 550a-b may also include respective data caches 556a-b coupled to provide data to execution units 554a-b. In the illustrated embodiment, data caches 556a-b may also provide data to floating point execution units 564 of FPU 560, which may be coupled to receive operations from FP scheduler 562. Data caches 556a-b and instruction cache 510 may additionally be coupled to core interface unit 570, which may in turn be coupled to a unified L2 cache 580 as well as to a system interface unit (SIU) that is external to core 101 (shown in FIG. 2 and described below). It is noted that although FIG. 1 reflects certain instruction and data flow paths among various units, additional paths or directions for data or instruction flow not specifically shown in FIG. 1 may be provided.

As described in greater detail below, core 101 may be configured for multithreaded execution in which instructions from distinct threads of execution may concurrently execute. In one embodiment, each of clusters 550a-b may be dedicated to the execution of instructions corresponding to a respective one of two threads, while FPU 560 and the upstream instruction fetch and decode logic may be shared among threads. In other embodiments, it is contemplated that different numbers of threads may be supported for concurrent execution, and different numbers of clusters 550 and FPUs 560 may be provided.

Instruction cache 510 may be configured to store instructions prior to their being retrieved, decoded and issued for execution. In various embodiments, instruction cache 510 may be configured as a direct-mapped, set-associative or fully-associative cache of a particular size, such as an 8-way, 64 kilobyte (KB) cache, for example. Instruction cache 510 may be physically addressed, virtually addressed or a combination of the two (e.g., virtual index bits and physical tag bits). In some embodiments, instruction cache 510 may also include translation lookaside buffer (TLB) logic configured to cache virtual-to-physical translations for instruction fetch addresses, although TLB and translation logic may be included elsewhere within core 101.

Instruction fetch accesses to instruction cache 510 may be coordinated by IFU 520. For example, IFU 520 may track the current program counter status for various executing threads and may issue fetches to instruction cache 510 in order to retrieve additional instructions for execution. In the case of an instruction cache miss, either instruction cache 510 or IFU 520 may coordinate the retrieval of instruction data from L2 cache 580. In some embodiments, IFU 520 may also coordinate prefetching of instructions from other levels of the memory hierarchy in advance of their expected use in order to mitigate the effects of memory latency. For example, successful instruction prefetching may increase the likelihood of instructions being present in instruction cache 510 when they are needed, thus avoiding the latency effects of cache misses at possibly multiple levels of the memory hierarchy.

Various types of branches (e.g., conditional or unconditional jumps, call/return instructions, etc.) may alter the flow of execution of a particular thread. Branch prediction unit 530 may generally be configured to predict future fetch addresses for use by IFU 520. In some embodiments, BPU 530 may include a branch target buffer (BTB) that may be configured to store a variety of information about possible branches in the instruction stream. For example, the BTB may be configured to store information about the type of a branch (e.g., static, conditional, direct, indirect, etc.), its predicted target address, a predicted way of instruction cache 510 in which the target may reside, or any other suitable branch information. In some embodiments, BPU 530 may include multiple BTBs arranged in a cache-like hierarchical fashion. Additionally, in some embodiments BPU 530 may include one or more different types of predictors (e.g., local, global, or hybrid predictors) configured to predict the outcome of conditional branches. In one embodiment, the execution pipelines of IFU 520 and BPU 530 may be decoupled such that branch prediction may be allowed to "run ahead" of instruction fetch, allowing multiple future fetch addresses to be predicted and queued until IFU 520 is ready to service them. It is contemplated that during multi-threaded operation, the prediction and fetch pipelines may be configured to concurrently operate on different threads.

As a result of fetching, IFU 520 may be configured to produce sequences of instruction bytes, which may also be referred to as fetch packets. For example, a fetch packet may be 32 bytes in length, or another suitable value. In some embodiments, particularly for ISAs that implement variable-length instructions, there may exist variable numbers of valid instructions aligned on arbitrary boundaries within a given fetch packet, and in some instances instructions may span different fetch packets. Generally speaking DEC 540 may be configured to identify instruction boundaries within fetch packets, to decode or otherwise transform instructions into operations suitable for execution by clusters 550 or FPU 560, and to dispatch such operations for execution.

In one embodiment, DEC 540 may be configured to first determine the length of possible instructions within a given window of bytes drawn from one or more fetch packets. For example, for an x86-compatible ISA, DEC 540 may be configured to identify valid sequences of prefix, opcode, "mod/rm" and "SIB" bytes, beginning at each byte position within the given fetch packet. Pick logic within DEC 540 may then be configured to identify, in one embodiment, the boundaries of up to four valid instructions within the window. In one embodiment, multiple fetch packets and multiple groups of instruction pointers identifying instruction boundaries may be queued within DEC 540, allowing the decoding process to be decoupled from fetching such that IFU 520 may on occasion "fetch ahead" of decode.

Instructions may then be steered from fetch packet storage into one of several instruction decoders within DEC 540. In one embodiment, DEC 540 may be configured to dispatch up to four instructions per cycle for execution, and may correspondingly provide four independent instruction decoders, although other configurations are possible and contemplated. In embodiments where core 101 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 550 or FPU 560. The resulting operations may also be referred to as micro-operations, micro-ops, or uops, and may be stored within one or more queues to await dispatch for execution. In some embodiments, microcode operations and non-microcode (or "fastpath") operations may be stored in separate queues.

Dispatch logic within DEC 540 may be configured to examine the state of queued operations awaiting dispatch in conjunction with the state of execution resources and dispatch rules in order to attempt to assemble dispatch parcels. For example, DEC 540 may take into account the availability of operations queued for dispatch, the number of operations queued and awaiting execution within clusters 550 and/or FPU 560, and any resource constraints that may apply to the operations to be dispatched. In one embodiment, DEC 540 may be configured to dispatch a parcel of up to four operations to one of clusters 550 or FPU 560 during a given execution cycle.

In one embodiment, DEC 540 may be configured to decode and dispatch operations for only one thread during a given execution cycle. However, it is noted that IFU 520 and DEC 540 need not operate on the same thread concurrently. Various types of thread-switching policies are contemplated for use during instruction fetch and decode. For example, IFU 520 and DEC 540 may be configured to select a different thread for processing every N cycles (where N may be as few as 1) in a round-robin fashion. Alternatively, thread switching may be influenced by dynamic conditions such as queue occupancy. For example, if the depth of queued decoded operations for a particular thread within DEC 540 or queued dispatched operations for a particular cluster 550 falls below a threshold value, decode processing may switch to that thread until queued operations for a different thread run short. In some embodiments, core 101 may support multiple different thread-switching policies, any one of which may be selected via software or during manufacturing (e.g., as a fabrication mask option).

Generally speaking, clusters 550 may be configured to implement integer arithmetic and logic operations as well as to perform load/store operations. In one embodiment, each of clusters 550*a-b* may be dedicated to the execution of operations for a respective thread, such that when core 101 is configured to operate in a single-threaded mode, operations may be dispatched to only one of clusters 550. Each cluster 550 may include its own scheduler 552, which may be configured to manage the issuance for execution of operations previously dispatched to the cluster. Each cluster 550 may further include its own copy of the integer physical register file as well as its own completion logic (e.g., a reorder buffer or other structure for managing operation completion and retirement).

Within each cluster 550, execution units 554 may support the concurrent execution of various different types of operations. For example, in one embodiment execution units 554 may support two concurrent load/store address generation (AGU) operations and two concurrent arithmetic/logic (ALU) operations, for a total of four concurrent integer operations per cluster. Execution units 554 may support additional operations such as integer multiply and divide, although in various embodiments, clusters 550 may implement scheduling restrictions on the throughput and concurrency of such additional operations with other ALU/AGU operations. Additionally, each cluster 550 may have its own data cache 556 that, like instruction cache 510, may be implemented using any of a variety of cache organizations. It is noted that data caches 556 may be organized differently from instruction cache 510.

In the illustrated embodiment, unlike clusters 550, FPU 560 may be configured to execute floating-point operations from different threads, and in some instances may do so concurrently. FPU 560 may include FP scheduler 562 that, like cluster schedulers 552, may be configured to receive, queue and issue operations for execution within FP execution units 564. FPU 560 may also include a floating-point physical register file configured to manage floating-point operands. FP execution units 564 may be configured to implement various types of floating point operations, such as add, multiply, divide, and multiply-accumulate, as well as other floating-point, multimedia or other operations that may be defined by the ISA. In various embodiments, FPU 560 may support the concurrent execution of certain different types of floating-point operations, and may also support different degrees of precision (e.g., 64-bit operands, 128-bit operands, etc.). As shown, FPU 560 may not include a data cache but may instead be configured to access the data caches 556 included within clusters 550. In some embodiments, FPU 560 may be configured to execute floating-point load and store instructions, while in other embodiments, clusters 550 may execute these instructions on behalf of FPU 560.

Instruction cache 510 and data caches 556 may be configured to access L2 cache 580 via core interface unit 570. In one embodiment, CIU 570 may provide a general interface between core 101 and other cores 101 within a system, as well as to external system memory, peripherals, etc. L2 cache 580, in one embodiment, may be configured as a unified cache using any suitable cache organization. Typically, L2 cache 580 will be substantially larger in capacity than the first-level instruction and data caches.

In some embodiments, core 101 may support out of order execution of operations, including load and store operations. That is, the order of execution of operations within clusters 550 and FPU 560 may differ from the original program order of the instructions to which the operations correspond. Such relaxed execution ordering may facilitate more efficient scheduling of execution resources, which may improve overall execution performance.

Additionally, core 101 may implement a variety of control and data speculation techniques. As described above, core 101 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 101 may be configured to discard operations and data along the misspeculated path and to redirect execution control to the correct path. For example, in one embodiment clusters 550 may be configured to execute conditional branch instructions and determine whether the branch outcome agrees with the predicted outcome. If not, clusters 550 may be configured to redirect IFU 520 to begin fetching along the correct path.

Separately, core 101 may implement various data speculation techniques that attempt to provide a data value for use in further execution before it is known whether the value is correct. For example, in a set-associative cache, data may be available from multiple ways of the cache before it is known which of the ways, if any, actually hit in the cache. In one embodiment, core 101 may be configured to perform way prediction as a form of data speculation in instruction cache 510, data caches 556 and/or L2 cache 580, in order to attempt to provide cache results before way hit/miss status is known. If incorrect data speculation occurs, operations that depend on misspeculated data may be "replayed" or reissued to execute again. For example, a load operation for which an incorrect way was predicted may be replayed. When executed again, the load operation may either be speculated again based on the results of the earlier misspeculation (e.g., speculated using the correct way, as determined previously) or may be executed without data speculation (e.g., allowed to proceed until way hit/miss checking is complete before producing a result), depending on the embodiment. In various embodiments, core 101 may implement numerous other types of data speculation, such as address prediction, load/store dependency detection based on addresses or address operand patterns, speculative store-to-load result forwarding, data coherence speculation, or other suitable techniques or combinations thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of processing units;
   a power controller configured to detect a power budget allotted for the apparatus;
   wherein the power controller is configured to convert the allotted power budget into a plurality of power tokens, wherein each power token is representative of a portion of the allotted power budget;
   wherein the power controller is further configured to assign one or more of the plurality of power tokens to each of the processing units, wherein each respective processing unit is configured to maintain its corresponding power usage depending upon the one or more tokens assigned to the respective processing unit; and
   wherein each respective processing unit is further configured, in response to determining that its corresponding power usage is greater than an allotted power represented by the one or more power tokens assigned to the respective processing unit, to:
      send a request to the power controller for one or more additional power tokens; and
      in response to the power controller failing to assign the one or more additional power tokens, to reduce its corresponding power usage a predetermined amount of time after sending the request.

2. The apparatus of claim 1, wherein, in response to receiving one or more additional requests, the power controller is configured to determine whether to change the distribution of power tokens among the plurality of processing units.

3. The apparatus of claim 1, wherein each respective processing unit is configured to detect its corresponding power usage, wherein each of the processing units is further configured to compare its corresponding power usage to the allotted power corresponding to the assigned power tokens for the respective processing unit.

4. The apparatus of claim 1, wherein each respective processing unit is further configured, in response to determining that its corresponding power usage is less than the allotted power for the respective processing unit by at least the power amount represented by a power token, the respective processing unit is configured to return one or more power tokens to the power controller.

5. The apparatus of claim 1, wherein the power controller is configured to receive one or more additional requests from the plurality of processing units for one or more additional power tokens, wherein, in response to receiving the one or more requests, the power controller is configured to determine whether to change the distribution of power tokens among the processing units based on at least the number of extra power tokens available, the number of additional power tokens requested, and the priority of the requesting processing units.

6. The apparatus of claim 1, wherein the apparatus is a processor integrated circuit, and the plurality of processing units comprises one or more of a processing core, a cache subsystem, a system interface unit, and a memory controller.

7. The apparatus of claim 1, wherein the apparatus is a computer system, and the plurality of processing units comprises one or more of a processor integrated circuit, a memory module, a disk drive, a network interface card, and a graphics card.

8. The apparatus of claim 1, wherein the apparatus is a modular server system, and the plurality of processing units are a plurality of server blades.

9. A method for managing power in a system including a power controller and a plurality of processing units, the method comprising:
   the power controller detecting a power budget allotted for the system;
   the power controller converting the allotted power budget into a plurality of power tokens, wherein each power token is representative of a portion of the allotted power budget; and
   the power controller assigning one or more of the plurality of power tokens to each of the processing units, wherein the assigned power tokens determine the power allotted for each of the processing units;
   each respective processing unit maintaining its corresponding power usage depending upon the one or more tokens assigned to the respective processing unit;
   one of the respective processing units, in response to determining that its corresponding power usage is greater than an allotted power represented by the one or more power tokens assigned to the one of the respective processing units:
      sending a request to the power controller for one or more additional power tokens; and
      in response to the power controller failing to assign the one or more additional power tokens, reducing its corresponding power usage a predetermined amount of time after sending the request.

10. The method of claim 9, further comprising, in response to receiving one or more additional requests, the power controller determining whether to change the distribution of power tokens among the plurality of processing units.

11. The method of claim 9, further comprising each respective processing units detecting its corresponding power usage, and comparing its corresponding power usage to the allotted power corresponding to the assigned power tokens for the respective processing unit.

12. A processor unit comprising:
a plurality of processor cores;
a power controller configured to detect a power budget allotted for the processor unit;
wherein the power controller is configured to convert the allotted power budget into a plurality of power tokens, wherein each power token is representative of a portion of the allotted power budget;
wherein the power controller is further configured to assign one or more of the plurality of power tokens to each of the processor cores, wherein each respective processor core is configured to maintain its corresponding power usage depending upon the one or more tokens assigned to the respective processor core; and
wherein each respective processor core is further configured, in response to determining that its corresponding power usage is greater than an allotted power represented by the one or more power tokens assigned to the respective processor core, to:
send a request to the power controller for one or more additional power tokens; and
in response to the power controller failing to assign the one or more additional power tokens, to reduce its corresponding power usage a predetermined amount of time after sending the request.

13. The processor unit of claim 12, wherein, in response to receiving one or more additional requests, the power controller is configured to determine whether to change the distribution of power tokens among the processor cores.

* * * * *